though means responsive to a

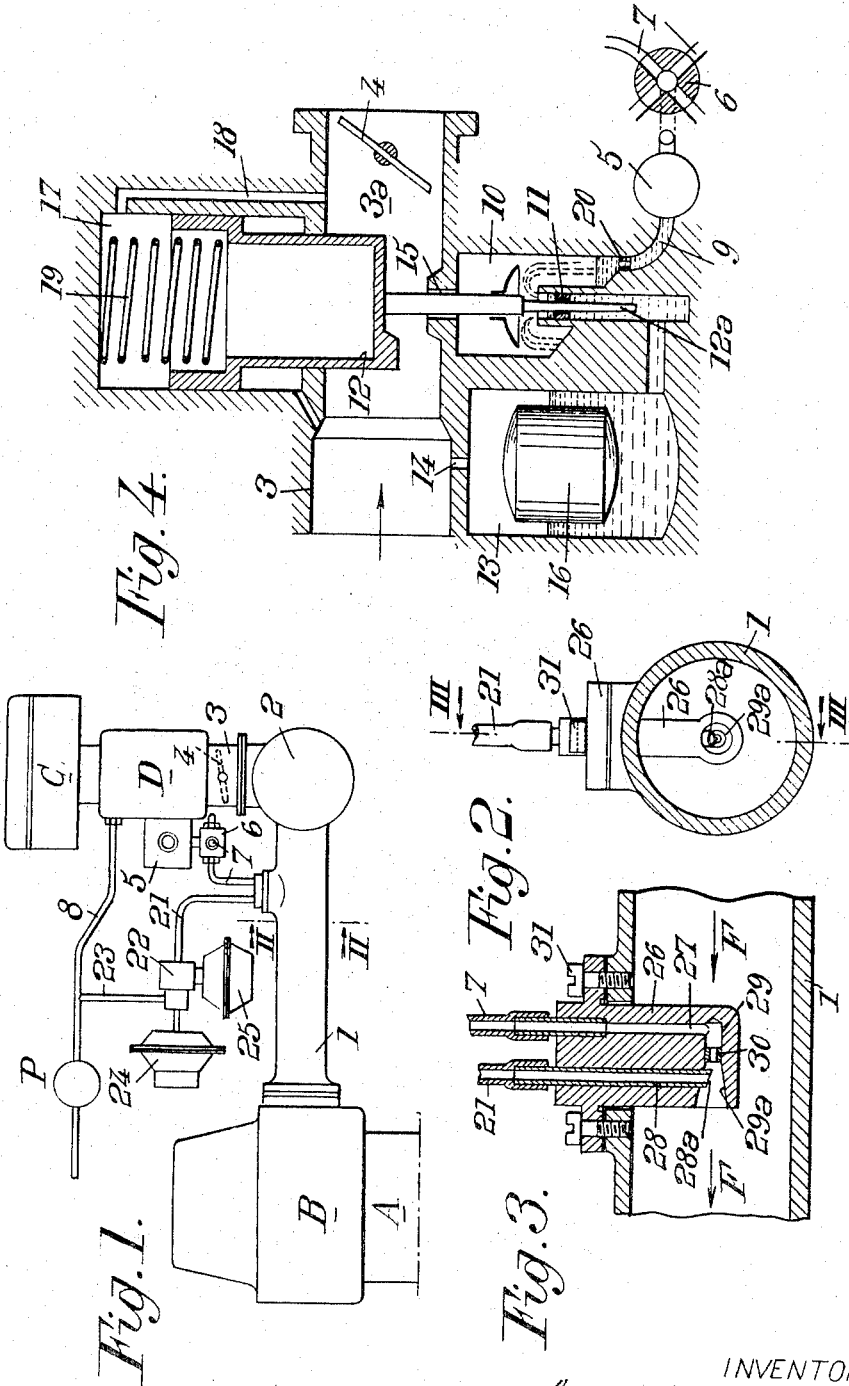

United States Patent Office 3,404,667
Patented Oct. 8, 1968

3,404,667
FUEL INJECTION DEVICES FOR INTERNAL COMBUSTION ENGINES
Andre Louis Mennesson, Neuilly-sur-Seine, France, assignor to Societe Industrielle de Brevets et d'Etudes S.I.B.E., Neuilly-sur-Seine, France, a society of France
Filed June 13, 1966, Ser. No. 557,288
Claims priority, application France, June 15, 1965, 20,762
8 Claims. (Cl. 123—119)

ABSTRACT OF THE DISCLOSURE

The fuel feed system comprises main fuel injecting means, including a main injection orifice, and auxiliary fuel injecting means, including an auxiliary orifice, for injecting supplementary fuel during pick up of the engine. Both orifices open into a conduit provided in a block secured to, and projecting inside, the induction pipe or the engine. The auxiliary orifice is located downstream of the main orifice, and is arranged so that the fuel stream issuing from the main orifice contributes in atomizing the fuel delivered through said auxiliary orifice.

---

The present invention relates to fuel injection devices for internal combustion engines including means for injecting into the induction pipe of the internal combustion engine, on the one hand for all working conditions, main fuel (or a primary air and fuel mixture) and, on the other hand during the pick up periods, supplementary fuel (hereinafter called "pick up fuel"). The invention is more especially, but not exclusively, concerned with devices of this kind wherein the main fuel is first metered in accordance with the flow rate of the air stream passing through the induction pipe, then taken up, together with air, by a pump which does not serve to meter the fuel but to feed it to at least one orifice or injector opening into the induction pipe.

Systems for injecting pick up fuel have been described in the present applicant's U.S. patent application No. 556,-296, filed June 9, 1966 for "Improvements in fuel feed systems for internal combustion engine." Furthermore devices wherein the injection pump does not serve to the metering of the main fuel have been described in the present applicant's U.S. Patent No. 3,198,498, granted Aug. 3, 1965 for "Pressure carburators."

The chief object of the present invention is to provide a fuel feed device of the above mentioned type such that the pick up fuel is better distributed in the air stream than up to the present time.

It consists chiefly in placing the (or each) orifice for feeding the pick up fuel into the induction pipe downstream of an orifice feeding the main fuel or primary mixture, in such manner that the fuel stream issuing from this last mentioned orifice contributes in atomizing the pick up fuel.

Preferred embodiments of the present invention will be hereinafter described with reference to the appended drawings, given merely by way of example, and in which:

FIG. 1 is a diagrammatic elevational view of a fuel feed device made according to the present invention;

FIGS. 2 and 3 show on an enlarged scale a cross section on the line II—II of FIG. 1 and a longitudinal section on the line III—III of FIG. 2, respectively;

FIG. 4 shows the metering system of a feed device according to this invention made according to a modification.

The fuel feed device as a whole is made as diagrammatically illustrated by FIG. 1.

This figure shows the internal combustion engine A including a cylinder head B and fed through an induction pipe 1. In the general case where there is a plurality of such induction pipes 1, they are all connected with a manifold 2 fed with air through a common pipe 3. This pipe may be vertical, in particular with an air circulation in the downward direction, as illustrated by FIG. 1. It may also be horizontal as shown by FIG. 4. But in a general manner it may extend in any suitable direction. The air flow rate is adjusted by means of a throttle valve 4. The inlet of pipe 3 is provided with an air filter C. Fuel flows through a metering system D where its flow rate is adjusted in accordance with the air flow rate through pipe 3. This fuel is sent under pressure by a pump 5 into induction pipe 1, with the interposition of a flow rate divider 6 and through pipes such as 7. The metering system D is itself fed with fuel from a tank, not shown, through a pump P and a pipe 8.

As indicated in the above mentioned second patent application, metering system D may be made as shown by FIG. 4. Pump 5, which is preferably driven through means distinct from the internal combustion engine and which serves only to create the injection pressure, collects, through a pipe 9, the fuel metered in a chamber 10 (to which it is fed under the same difference of pressure as the air flowing through a section 3a of pipe 3) through a passage 11 of variable cross section area, proportional to the cross section area of the upward portion of said pipe section 3a, the whole being such that chamber 10 is at the same pressure as portion 3a whatever be the conditions of operation of pump 5. Section 3a of pipe 3 is limited upstream by a throttling member 12 automatically controlled in such manner as to ensure in said pipe section 3a a pressure of substantially constant value or a pressure following a predetermined law as a function of the air flow rate in pipe 3, throttling member 12 acting, through a needle 12a, upon the cross section area of passage 11. The latter is located between, on the one hand, a constant level chamber 13 subjected, through a hole 14 either to the same pressure as the air inlet of pipe 3 or to the atmospheric pressure, and, on the other hand, chamber 10 where the pressure is the same pressure as in section 3a of pipe 3 owing to the provision of a communication passage 15. Constant level chamber 13 is fed with fuel through a pipe 8 wherein is disposed a needle valve (not shown) controlled by float 16.

Throttle valve 12 consists, in the example shown, of a piston slidable in a cylinder 17 and urged, in the outward direction, by the suction existing in section 3a of induction pipe 3 and transmitted through a conduit 18 and, in the opposed direction, by a spring 19. A restricted orifice, or jet, 20 is provided between chamber 10 and pipe 9.

This orifice 20 is determined in such manner that, when the maximum flow rate is required by the engine, pump 5 is capable of instantaneously evacuating all the fuel received by chamber 10. Therefore, under conditions of operation where the fuel flow rate is below that corresponding to maximum power, pump 5 delivers not only the fuel that has flown through passage 11 but also the air arriving through passage 15 and delivers the mixture of air and fuel to pipes 7.

Concerning the device for injecting pick up fuel, it is advantageously made as disclosed in the first of the above mentioned patent applications. For this purpose, there is provided a conduit 21 (FIG. 1) opening into induction pipe 1 and connected to a casting 22 itself connected through a pipe 23 with the delivery pipe 8 of pick up pump P. This casing 22 contains a valve adapted to control the communication between pipe 23 and pipe 21 and which is actuated through means responsive to a sudden increase of the air flow rate through pipe 3, such means being diagrammatically represented by a pressure responsive device comprising a rigid casing 24 and a deformable diaphragm in said casing. Preferably, between pipes 23 and 21, there is provided an accumulator 25 of fuel under pressure fed through conduit 23 and placed in communication, through pressure responsive device 24, with pipe 21 during the pick up periods.

Now, according to the present invention, the orifice, called "auxiliary orifice," through which pipe 21 delivers the pick up fuel opens into induction pipe 1 downstream of the orifice, called "main orifice," through which pipe 7, which delivers the main fuel or primary mixture opens into said induction pipe 1.

For this purpose, pipes 7 and 21 open into a block 26 provided with two passages 27 and 28 which form extensions of pipes 7 and 21 respectively. Passage 28 opens downstream of the opening of passage 27, with reference to the direction of flow of the air stream, as indicated by arrow F, into a conduit 29 provided in block 26 and substantially parallel to induction pipe 1, preferably along the axis thereof. Between the two outlet orifices of passages 27 and 28 opening into conduit 29 there is provided a jet or constriction 30. The portion 29a of conduit 29 located downstream of constriction 30 may have a flaring shape, as shown by FIG. 3. The passage 28 which delivers the pick up fuel may be limited by a tube projecting into portion 29a and bevelled at 28a.

Block 26 is fixed in induction pipe 1 through screws 31.

This device works as follows:

When the engine is running at low speed or is idling, the fuel flow required by the engine is very little and, consequently, pump 5 delivers but a small amount of fuel, just that necessary for running the engine, but, on the other hand, it delivers a relatively high amount of air. The mixture of this fuel with this air passes through constriction 30 which gives it a high velocity, pump 5 being generally of the volumetric type.

When there is an engine pick up, produced by a sudden opening of throttle valve 4, as the fuel precedingly metered to the flow rate just necessary for running the engine arrives to constriction 30 with some lag with respect to the air flowing through induction pipe 1, the pick up device consisting of elements 21 to 25 compensates for this lag by injecting, from the beginning of the pick up, a small amount of pick up fuel. This fuel arrives through pipe 21 and passage 28 and the bevelled edge 28a of passage 28 is located in the stream of primary mixture delivered through constriction 30. Now, as above explained, this mixture contains chiefly air and only a very small amount of fuel, whereby the whole of the end of pipe 28 and of constriction 30 constitutes a very satisfactory atomizer for the pick up fuel injected though passage 28.

The invention therefore permits of grouping, in a block 26 easy to fit in induction pipe 1, the passages 27 and 28 which respectively deliver the main primary mixture and the pick up fuel while ensuring an excellent distribution of this pick up fuel in the air stream.

Of course, conduit 1 and block 26 might have any other direction than that illustrated by FIGS. 1 to 3.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

I claim:
1. For use with an internal combustion engine, a fuel feed system which comprises, in combination:
    an induction pipe leading to said engine,
    an inlet pipe connected to said induction pipe for feeding primary air thereto,
    carburetting means for feeding fuel and secondary air to said engine, provided with a main orifice opening into said induction pipe, said carburetting means including, on the one hand, metering means adapted to meter said fuel in accordance with the primary air flow rate in said inlet pipe, and on the other hand, a pump adapted to pump said metered fuel, together with secondary air, to said main orfice.
    an auxiliary device for feeding a supplementary amount of fuel to said engine when it is picking up, said auxiliary device being provided with an auxiliary orifice opening into said induction pipe,
    a block secured to said induction pipe and projecting to the inside thereof, said block being provided with a conduit,
    said main orifice and said auxiliary orifice both opening into said conduit, said auxiliary orifice being located downstream of said main orifice with respect to the direction in said conduit of the flow of the fuel and secondary air stream issuing from said main orifice, and said auxiliary orifice being arranged so that the fuel and secondary air stream issuing from said main orifice contributes in atomizing the fuel delivered through said second mentioned auxiliary orifice.

2. A fuel feed system according to claim 1 further including a constriction in said conduit between said two orifices.

3. A fuel feed system according to claim 2 wherein said conduit has a longitudinal axis that is parallel to the axis of the portion of the induction pipe into which said block projects.

4. A fuel feed system according to claim 3 wherein said conduit longitudinal axis is in coincidence with the axis of said induction pipe portion.

5. A fuel feed system according to claim 1 comprising a passage for feeding the supplementary amount of fuel which consists of a tube penetrating into said conduit and the end of which is of bevel shape.

6. A fuel feed system according to claim 1 wherein the portion of said conduit into which opens the orifice for delivering the pick up fuel is of flaring shape.

7. A fuel feed system according to claim 2 wherein said conduit diverges, downstream of said constriction, until its outlet from said block, and said block includes a passage, approximately perpendicular to said conduit, through which passage said supplementary amount of fuel passes just before reaching said auxiliary orifice.

8. A fuel feed system according to claim 1 wherein a plurality of induction pipes are provided, said induction pipes being connected to a common inlet pipe.

References Cited

UNITED STATES PATENTS

| | | | |
|---|---|---|---|
| 1,610,825 | 12/1926 | Thomas | 261—78 XR |
| 2,857,203 | 10/1958 | Korte | 261—78 XR |
| 2,860,859 | 11/1958 | Dolza | 261—78 |
| 3,198,498 | 8/1965 | Mennesson | 261—50.1 |
| 3,330,541 | 7/1967 | Jackson | 261—78 |

LAURENCE M. GOODRIDGE, *Primary Examiner.*